United States Patent [19]

Kender et al.

[11] Patent Number: 4,792,696
[45] Date of Patent: Dec. 20, 1988

[54] METHOD AND AN APPARATUS FOR DETERMINING SURFACE SHAPE UTILIZING OBJECT SELF-SHADOWING

[75] Inventors: John R. Kender, Leonia, N.J.; Earl M. Smith, New York, N.Y.

[73] Assignee: Trustees of Columbia University in the City of New York, Morningside Heights, N.Y.

[21] Appl. No.: 58,914

[22] Filed: Jun. 5, 1987

[51] Int. Cl.⁴ ...................... G01N 21/86; G01B 11/24
[52] U.S. Cl. ..................... 250/560; 356/376
[58] Field of Search ............... 250/558, 560, 561; 356/376, 379; 358/107

[56] References Cited

U.S. PATENT DOCUMENTS

| | | | |
|---|---|---|---|
| 3,589,815 | 6/1971 | Hosterman | 356/4 |
| 3,976,382 | 8/1976 | Westby | 356/237 |
| 4,089,608 | 5/1978 | Hoadley | 358/106 |
| 4,404,684 | 9/1983 | Takada | 356/376 |
| 4,473,750 | 9/1984 | Oshida et al. | 250/560 |
| 4,500,206 | 2/1985 | Cole et al. | 356/376 |
| 4,529,316 | 7/1985 | DiMatteo | 356/376 |
| 4,608,709 | 8/1986 | Hedler et al. | 250/223 B |
| 4,627,734 | 12/1986 | Rioux | 356/376 |

FOREIGN PATENT DOCUMENTS

| | | | |
|---|---|---|---|
| 0729858 | 3/1966 | Canada | 250/558 |
| 55-155205 | 5/1979 | Japan | |
| 0044924 | 3/1980 | Japan | 356/376 |
| 59-20805 | 2/1984 | Japan | |
| 0002105 | 1/1987 | Japan | 356/376 |
| 0686001 | 9/1979 | U.S.S.R. | 356/376 |

Primary Examiner—David C. Nelms
Assistant Examiner—Steve McGowan
Attorney, Agent, or Firm—Brumbaugh, Graves, Donohue & Raymond

[57] ABSTRACT

A method and apparatus are provided wherein a moving light source is passed over a surface whose shape is to be determined, in two orthogonal paths and is fixed at a plurality of positions along each path such that the light source illuminates the surface at a different slope for each position. A binary image camera photographs the surface for each of the fixed positions and the point at which each of a plurality of points on the surface is first illuminated and last illuminated, as well as the points that last shadowed or last failed to shadow any given point, are recorded. Constraint equations develop the effect a given point has on its last and failing shadowers and the effect each last and failing shadower has on the given point. Upper and lower bounds of these points are iteratively re-calculated according to the constraint equations until none of the points exhibit any more change in their upper and lower bounds.

8 Claims, 4 Drawing Sheets

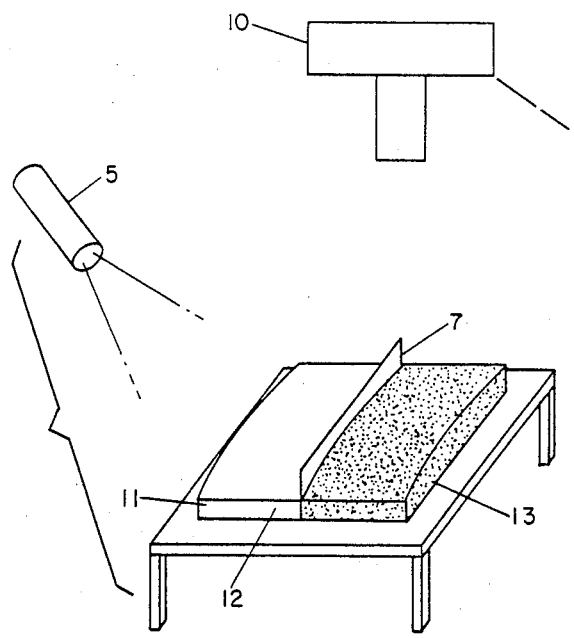
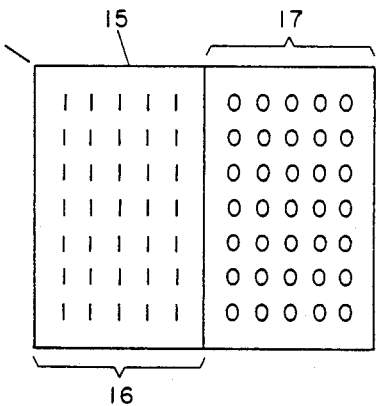
FIG.1(a)    FIG.1(b)
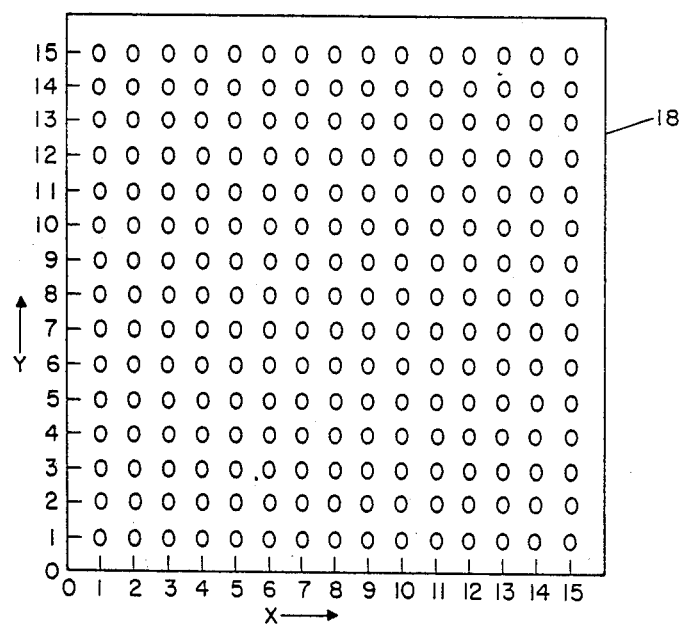
FIG. 2

METHOD AND AN APPARATUS FOR DETERMINING SURFACE SHAPE UTILIZING OBJECT SELF-SHADOWING

BACKGROUND OF THE INVENTION

The present invention relates to a method and an apparatus for determining surface configuration utilizing a moving light source and the object self-shadowing created by the motion of the light source across the surface.

Various methods for determinnng the surface topography of an object, or a portion thereof, based on the reflective properties of the subject surface are known in the art. However, these methods suffer a great defect in that either there must be direct contact or the material composition of the surface must be known before the methods can be applied. These latter known methods employ principles of gradual shading by measuring the amount of light reflected back from the surface and, therefore, have a further deficiency in that the surface must be as smooth as possible in order to optimize the reflection therefrom.

The present invention overcomes these deficiencies by providing a means for determining surface configuration without knowledge of the composition of the object or the surface reflective properties thereof, and without any direct contact. The surface information is extracted solely on the basis of object self-shadowing under a moving light source. This property lends the present invention to many applications including, for example, industrial robots, robotic vision, reconnaissance, part inspection, and identification.

The present invention has a further advantage in that the placement of the light source is not critical inasmuch as it may be close to the object or a great distance therefrom.

SUMMARY OF THE INVENTION

In accordance with the present invention, a moving light source is passed over a surface whose shape is to be determined, in two intersecting paths and is fixed at a plurality of positions along each path such that the light source illuminates the surface at a different slope for each position. A binary image camera photographs the surface for each of the fixed positions and thereafter processing means records slope of the positions of the light source at which each of a plurality of points on the surface is first illuminated and last illuminated, as well as the points that last shadowed or last failed to shadow any given point. Constraint equations develop the effect a given point has on its last and failing shadowers and the effect each last and failing shadower has on the given point. Upper and lower bounds of these points are iteratively re-calculated according to the constraint equations until none of the points exhibit any more change in their upper and lower bounds. For a better understanding of the invention, as well as other objects and further features thereof, reference is had to the following detailed description of the preferred embodiment which makes reference to the following set of drawings.

BRIEF DESCRIPTION OF THE DRAWINGS

FIGS. 1(a) and (b) are illustrative drawings showing the operation of a binary image camera used in accordance with the present invention;

FIG. 2 is a representative output of the camera of FIG. 1 for the example of the first embodiment of the present invention;

Figure 3:
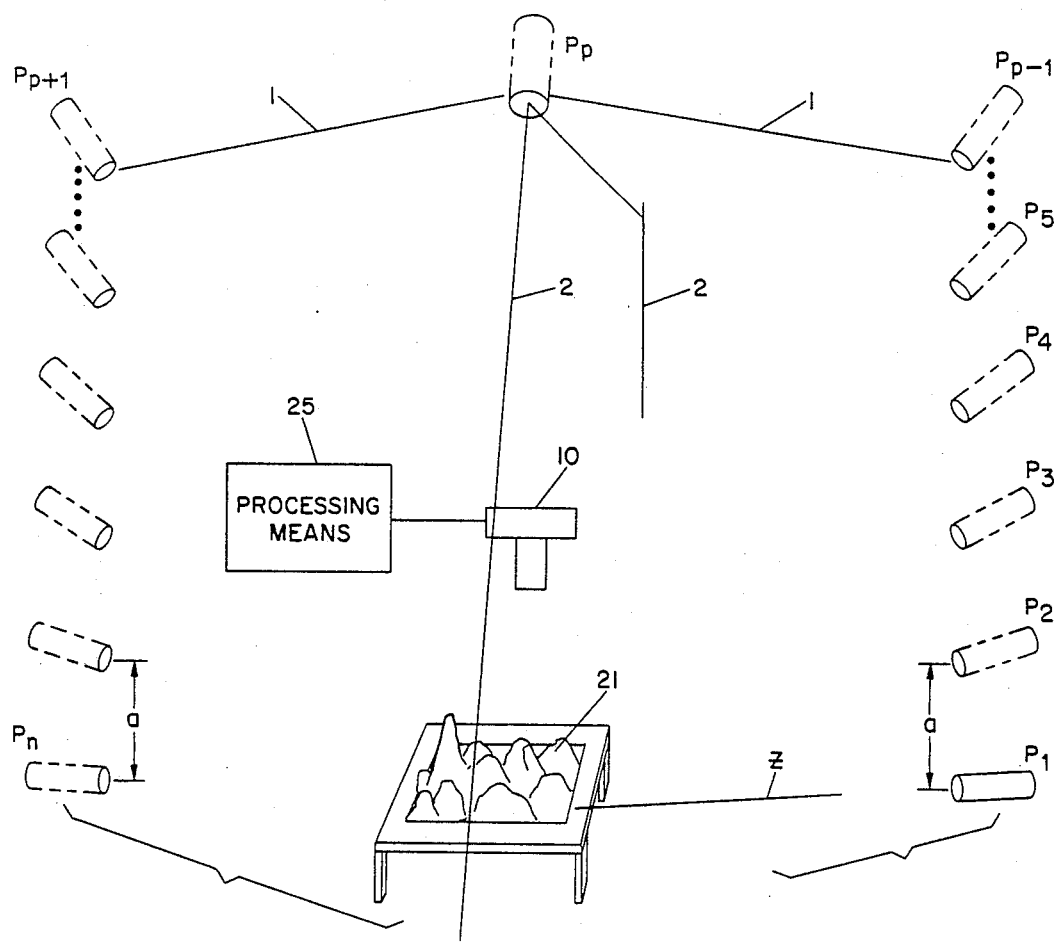
FIG. 3 is an illustrative drawing of the apparatus of the present invention.
Figures 5A, 5B:
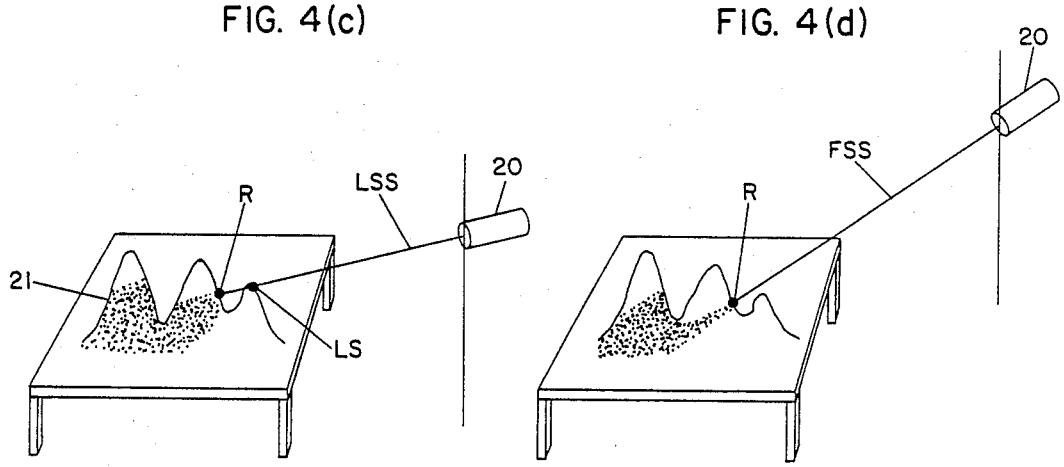
Figure 5C:
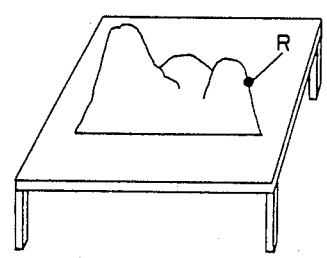
Figure 6:
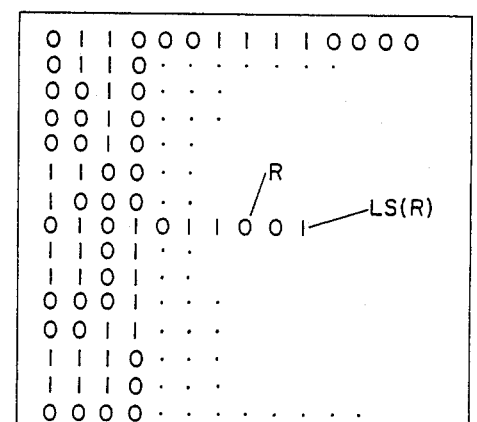

FIGS. (4a)–(d) are varying embodiments of the configuration of the light source used in accordance with the apparatus of FIG. 3;

FIGS. 5(a) and (b) illustrate the last and failing shadower slopes of the method according to the present invention;

FIG. 5(c) shows a point without shadowers in an eastern trace;

FIG. 6 shows the output of the binary image camera of FIG. 1 for the last shadower slope position.

Figure 7A:
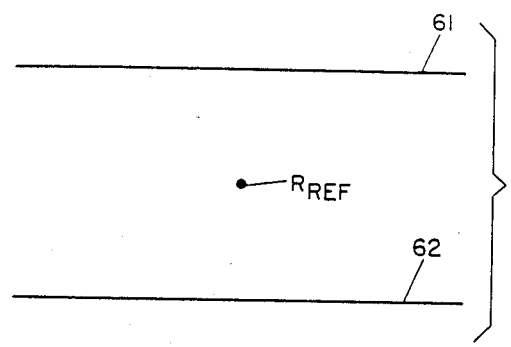
Figure 8:
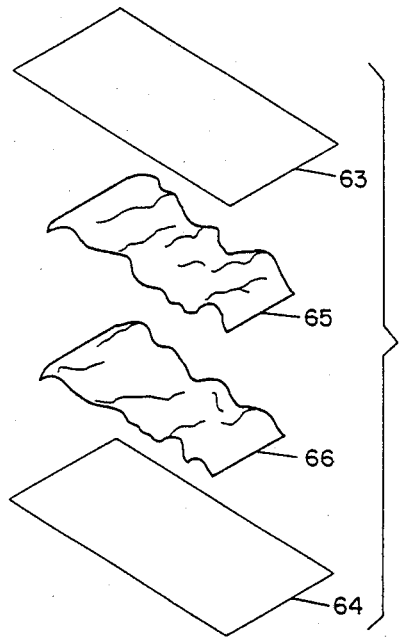
Figure 10:
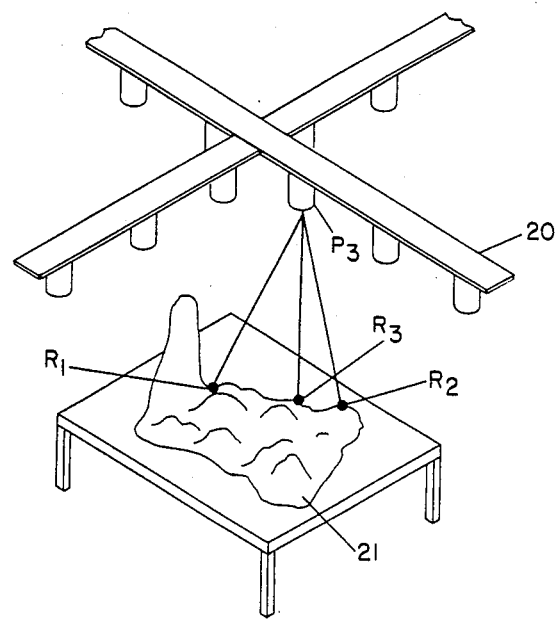
Figure 9:
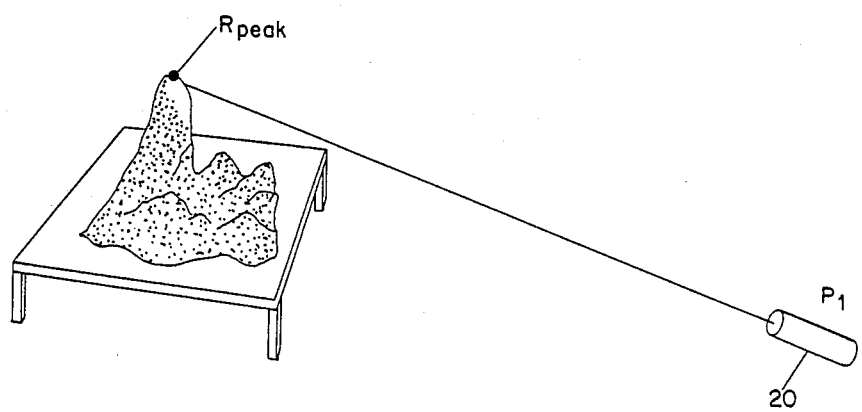

FIGS. 7(a) and (b) show the initial bounds of a surface in relation to a reference point;

FIG. 8 is an illustration of the final upper and lower bounds calculated in accordance with the first example of the present invention;

FIG. 9 is an illustration of a position of a light source which first strikes a surface;

FIG. 10 is an apparatus used in accordance with a second embodiment of the present invention.

DESCRIPTION OF THE PREFERRED EMBODIMENTS

Referring to the drawings, there is shown in FIG. 1(a) a binary image camera 10 used in accordance with the present invention. Such cameras have as their image output a digital matrix whose elements are a binary representation of the illumination pattern of the subject surface. For purposes of explaining the operation of camera 10, the surface 11 of FIG. 1(a) has a thin plate 7 mounted thereon to block the light emanating from source 5, thereby keeping side 13 in shadow. With reference to FIG. 1(b), when camera 10 photographs surface 11, the resultant output elements 16 of matrix 15 corresponding to the illuminated portion 12 of surface 11 are digitally represented by logic "1"'s, while those elements 17 corresponding to the shadowed portion 13 are digitally represented by logic "$\phi$"'s. Each of these binary coded image points are termed pixels, and the size of the matrix, i.e., the resolution of the camera or number of pixels, can vary. For instance, some cameras have typical resolutions of 256×256.

In a first embodiment of the present invention, the light source is placed at a substantially infinite distance from the surface. A substantially infinite distance is one where all of the points on the surface are illuminated, i.e., they look back to see the light source, at the same angle or slope for any given position of the light source. Such a distance is, of course, relative to the size of the subject surface. For example, if the surface is a given portion of the earth, the sun is at a substantially infinite distance. If the size of the subject surface is small, the light source may only have to be placed a few feet away.

In this example, the number of pixels is arbitrarily chosen as 256, giving a 16×16 pixel matrix 18 shown in FIG. 2. Superimposed on the output matrix 18 is a coordinate system having horizontal coordinates X and vertical coordinates Y which correspond in range to the size of the output matrix 18. Here, the 16×16 output matrix 18 has X and Y coordinates 0-15. Each of the 256 pixels can be identified by reference to its X and Y coordinates. The coordinate system and binary image output matrix can be combined in any known manner of photographic superimposition.

Figures 4A, 4B:
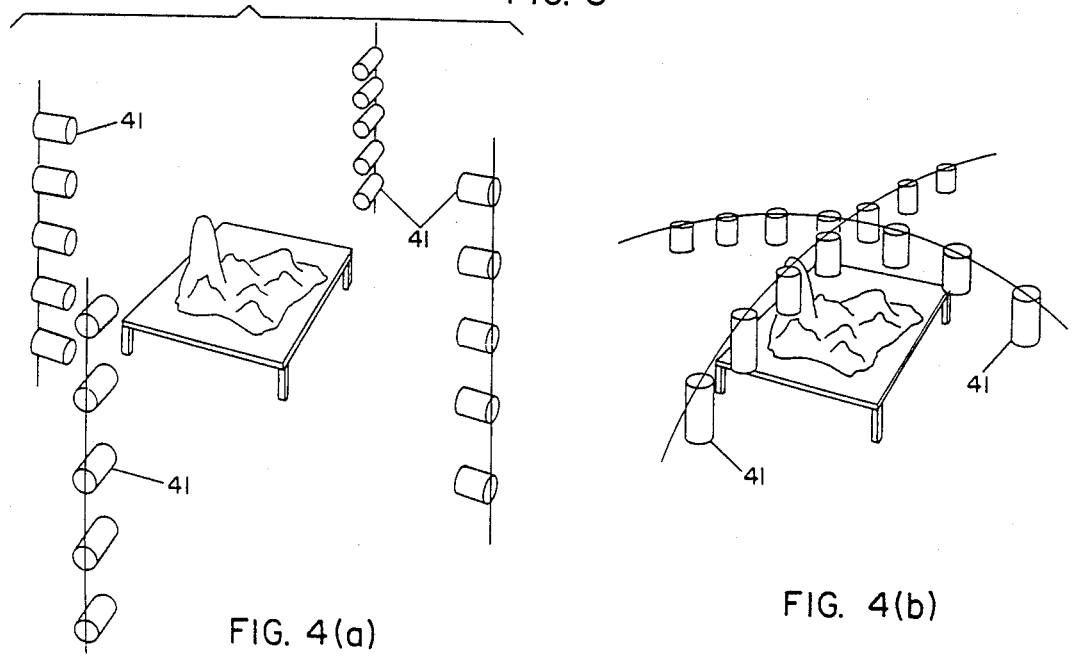
Figure 4C:
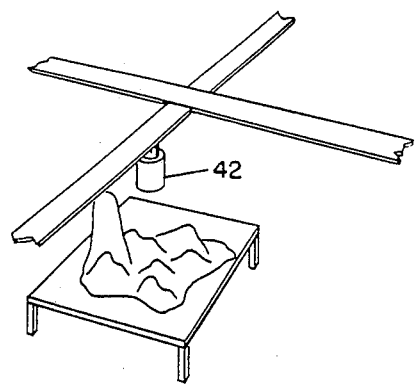
Figure 4D:
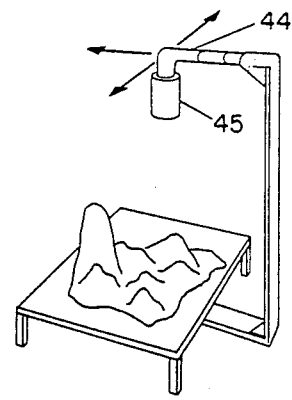

With reference to FIG. 3, various fixed positions corresponding to movement of the collimated light source 20 above the subject surface 21 are labelled as $P_1$-$P_n$. These positions may increase in height only at a given distance from the subject surface 21, as in FIG. 3, or they may assume other forms, as shown in FIG. 4. The movement of the light source is in two intersecting directional paths, east-west path 1 and north-south path 2. As shown in FIG. 3, these paths are perpendicular at their point of intersection. As used herein, light emanating from a reference direction is light that emanates from a general direction, e.g., north, south, east or west, without regard to the height of the light source. The substantially infinite distance of the light source makes the configuration of FIG. 3 have the same effect with regard to illumination of the surface 21 as each of the embodiments of FIG. 4. In FIG. 3, the light source 20 is a single source moved to each fixed position. In FIGS. 4(a) and (b) the light source 41 is a series of sequentially activated lamps. In FIG. 4(c), the light source 42 is slidably mounted on a track 43. A robot arm 44 controls the light source 45 in FIG. 4(d).

In FIG. 3, the light source positions $P_1$-$P_n$ are shown only for the east-west path 1. It is to be understood that corresponding positions of the light source are assumed along the north-south path 2.

The two directional paths are broken down into four directional traces based on the direction of illumination. The light emanates from the east in the eastern directional trace; from the west in the western directional trace; from the north in the northern directional trace; and from the south in the southern directional trace.

Binary image camera 10 photographs the subject surface 21 at each of the selected positions $P_1$-$P_n$ and outputs corresponding binary images $BI_1$-$BI_n$, as described above, for each directional trace to processing means 25 for storage therein. The camera 10 is fixed above the subject surface 21 at a sufficient distance to enable it to properly frame the surface 21. The number of positions chosen is arbitrary; however, the position $P_p$ is always chosen. $P_p$ represents the position where the light source 20 is directly above the subject surface 21, such that all points are illuminated. The fixed positions $P_1$-$P_p$ are termed the positive positions because the slopes at which these images are taken increase positively from $P_1$-$P_p$ and fixed positions $P_p$-$P_n$ are similarly termed the negative positions because of their decreasing negative slopes. For labelling purposes, we will call positions $P_1$-$P_p$ the AM and positions $P_p$-$P_n$ the PM.

$P_1$ is a position where the light can first strike the subject surface 21 and $P_n$ is a position where the light last strikes the subject surface 21, i.e., at any position of the light source 20 below $P_1$ or $P_n$ all of the subject surface 21 would be in darkness.

It should be noted that it is not necessary to take the binary image $BI_p$ corresponding to position $P_p$ since that position is defined as one where all of the subject surface 21 is illuminated. The matrix output of such an image would consist of all logic "1's", and therefore, the output matrix of image $BI_p$ can be set to all ones by processing means 25 without having an actual image taken.

The slope at which each image is taken must be known and is either supplied to or calculated by processing means 25 for each respective image, except for image $BI_p$, which has an infinite slope. This can be accomplished in any number of ways. For instance, the known slope at which each image was taken can be directly entered into processing means 25. Alternatively, the known slope of the first image taken $BI_1$ can be entered as slope Z taken at time t. Thereafter, subsequent images are taken at slopes which are increased by a constant (a) from the slope Z at which $BI_1$ was taken, until $BI_{p-1}$, and thereafter decreased from $BI_{p+1}$ by the same value until $BI_n$. If image $BI_1$ is taken at time t, then each of the images $BI_2$-$BI_n$ are taken at times t+1, t+2, ... t+n-1, corresponding respectively to the number of images taken. The slope at any given image $BI_n$ where n<p is given by the equation $(n-1)(a)+Z$. For images where n>p, the slope is given by $-((2p-n-1) \cdot a + Z)$. For instance, image $BI_4$ would correspond to period t+3, and if the slope increment (a) is constant, then the slope at which image $BI_4$ was taken is three times the constant slope increment (a) added to the slope Z at which $BI_1$ was taken, provided 4<p. Thus, the processing means 25 need only be supplied with the initial slope Z, the constant slope increment (a), and the number of the binary image in order to determine the slope at which any of the images was taken. The processing means could perform a similar function even if the slope increment (a) is not constant. However, in this case, the processing means 25 must additionally be supplied with the value of the slope increment for each of the images taken.

Nevertheless, utilization of any of the above-mentioned techniques gives the same result, i.e., the processing means 25 has stored therein a 256 pixel image of the subject surface 21 for each position $P_1$-$P_n$, and the slope at which each such image was taken. Further, the various images need not be presented to the processing means 25 in order of increasing or decreasing value. As long as the slope at which each such image was taken is known, the processing means 25 can place them in proper order.

After each of the binary images $BI_1$...$BI_n$ are stored in processing means 25 and the images have been sorted based on their ascending positive slopes, i.e., those corresponding to images $BI_1$-$BI_p$, and descending negative slopes, i.e., those corresponding to images $BI_1$-$BI_n$, it is necessary to determine, for any given point R on the surface 21 and its corresponding pixel in any of the binary images, the relative time and slope at which R first became illuminated, i.e., in the AM, as well as the pixels that last shadowed R and just failed to last shadow R in the AM, respectively. A similar determination is made for the point at which R first goes into shadow after having been illuminated, i.e., in the PM. For an understanding of this step of the present method, reference is made to FIG. 5.

There is shown in FIG. 5 a portion of the subject surface 21 having a point R at some arbitrary location thereon.

As shown in FIG. 5a, there is a position of the light source 20 which is just below the slope necessary to illuminate the point R. FIG. 5b shows the next positive slope which has caused R to become illuminated. In FIG. 5a, R remains shadowed because of a point LS which is illuminated by the light source 20 but which prevents the light source 20 from illuminating R, i.e., point LS casts a shadow on R. The slope of the image at which R, or any given point in shadow, was last in shadow is termed the last shadower slope LSS, as in FIG. 5a, and the next most positive slope is termed the failing shadower slope FSS because it is the first slope at which the point is no longer shadowed, as in FIG. 5b.

The failing shadower slope and last shadower slope in the PM are governed by the same principle, except that the slopes have negative values.

Once the last and failing shadower slopes of R are determined, it becomes necessary to identify the point LS(R) which last shadowed R in the last shadower slope, and the point FS(R) which last attempted to shadow R in the failing shadower slope.

All of the above-mentioned slopes and points are easily derived by processing means 25.

Since the processing means 25 contains binary images $B_1-B_n$ corresponding to the various positions $P_1-P_n$ of the light source, the slope at which R first became illuminated is easily obtained by comparing the binary values of R in each of the binary images $B_1-B_n$. The binary value of R will remain at logic zero as long as R is shadowed and will become a logic 1 when R is first illuminated, thereafter remaining at logic 1 until it again goes into shadow. Processing means 25 will look at the value of R for each image and determine in what image the value first became a logic 1. The slope of the binary image at which R first became illuminated is the failing shadower slope FSS, shown in FIG. 5b. The slope of the image where R was last a binary zero is the last shadower slope LSS, shown in FIG. 5(a). In the PM, or negative direction, the slope of the binary image where R is last a one is the failing shadower slope, and the slope of the image where it goes into shadow after having been illuminated is the last shadower shape.

For the point R, or any given point on subject surface 21, the last shadower of R, or LS(R) is determined by scanning the binary image corresponding to the last shadowes slope LSS in the direction of illumination, i.e., towards the light source. Since here the light is coming from the east, the direction of illumination in the output matrix is the positive X direction. For the case in which the light is emanating from the west, the direction of illumination is the negative X direction. Smmilarly for light from the north, the illumination direction is the positive Y direction and for light from the south, the illumination direction is the negative Y direction. The point LS(R) on the subject surface 21 which last shadowed R must be an illuminated point in order to cast any shadow at all, and must be the first illuminated point encountered as the binary image is scanned in the direction of illumination since any shadow that falls on R must be caused by the nearest such shadower. Processing means 25 determines the point LS(R) which last cast a shadow on R, before R became illuminated, by looking in the direction of illumination at the binary image corresponding to the last shadower slope LSS, beginning at the point R, as shown in FIG. 6. The first logic 1 encountered as the last shadower slope image is so scanned must, therefore, be the last shadower of R, i.e., LS(R). LS(R) is identified by its (X,Y) coordinate.

Similarly, the failing shadower of R, FS(R), is determined by scanning the binary image corresponding to the failing shadower slope FSS in the direction of illumination. The point FS(R) must also be the first illuminated point i.e., the first logic one, encountered as the failing shadower slope image is scanned in the direction of illumination since only the nearest illuminated point adjacent illuminated point R could have been the last point attempting, but failing, to shadow R.

The coordinate system superimposed on the binary images allows processing means 25 to easily compute the distance between R and its last shadower LS(R), and failing shadower FS(R), by using principles of simple distance calculation between two points having fixed coordinate positions.

The procedure described above for determining the last shadower slope LSS, failing shadower slope FSS, failing shadower FS(R) and last shadower LS(R) for the AM position with the light emanating from the east is repeated for the PM position where the light is emanating from the west in exactly th same manner. Of course, the LSS and FSS quantities will be negative in the PM position.

Similarly, the procedure is repeated again for the north-south trace of the light source, once for AM with the light emanating from the north, and once for PM with the light emanating from the south.

Sixteen quantities consisting of the LSS, FSS, FS(R) and LS(R) of each point in each of the four trace directions, east, west, north and south, are obtained for each of the 256 pixels such that, for any given point R, processing means 25 stores the following values:

| | |
|---|---|
| For the eastern trace: | E-AM FSS |
| | E-AM LSS |
| | E-AM FS(R) |
| | E-AM LS(R) |
| For the western trace: | W-PM FSS |
| | W-PM LSS |
| | W-PM FS(R) |
| | W-PM LS(R) |
| For the northern trace: | N-AM FSS |
| | N-AM LSS |
| | N-AM FS(R) |
| | N-AM LS(R) |
| For the southern trace: | S-PM FSS |
| | S-PM LSS |
| | S-PM FS(R) |
| | S-PM LS(R) |

Processing means 25 stores each of these quantities for all 256 pixels, the failing shadower FS(R) and last shadower LS(R) being represented by their (X,Y) coordinates. This collective set of values for all points is termed a suntrace.

There is, of course, the possibility that a point R may not have a failing shadower or last shadower in one or more of the four trace directions since it is the actual physical configuration of the surface that will dictate when a given point will have a last or failing shadower. An example of such a surface is shown in FIG. 5(c), whereby it is easily seen that such a surface configuration prohibits the point R from having any shadowers in the eastern AM trace.

The determination of the last and failing shadowers and the slope at which they occur is necessary to the derivation of the surface in that each pixel affects and is affected by these critical shadowers. The interrelationship of each of the points and their shadowers puts constraints on the upper and lower bound of each point. By equating the effect that each shadower has on any given point, and that each point has on its shadower, a height can be determined for each of these points relative to the others.

Constraint equations are developed to relate a given point's height with a second point's height in both a forward and backward direction. The forward constraint equation describes the effect of a given point's shadowers on that point and the background constraint equation describes the effect a given point has on its shadowers. The operation of these constraint equations is described herein below.

The forward constraint equations operate as follows. If the last shadower LS(R) of point R lies between an upper and lower bound, then point R must be below this upper bound of LS(R), otherwise LS(R) could not successfully shadow it. Thus, the last shadower LS(R) constrains the upper bound of R. The determination of the constraint on R's upper bound does not, however, provide any information as to how far below LS(R) point R lies.

The failing shadower FS(R) of point R provides this constraint on the lower bound of R. If the failing shadower FS(R) of point R has a certain height, then point R must be above this height, otherwise FS(R) would not fail in its attempt to shadow R. Thus, the failing shadower FS(R) constrains the lower bound of R.

The backward constraint equations calculate the effect R has on its shadowers. They are termed backward because what is taken for granted is R's bounds, and what is calculated is the bounds of the last and failing shadower in view of R's bounds. If R has a last shadower LS(R), in order for LS(R) to successfully shadow R, it cannot be below a given height, otherwise its shadow would be too small to successfully shadow R. R, therefore, places a constraint on the lower bound of the last shadower LS(R). Similarly, if R has a failing shadower FS(R), in order for FS(R) to fail in its attempt to shadow R, it must be below a certain upper bound. R, therefore, places a constraint on the upper bound of FS(R).

The upper and lower bound constraint equations for both the AM and PM positions are given as follows:

FORWARD CONSTRAINT

UPPER BOUND: $U(R) \leq U(LS(R)) - (LS(R) - R) \cdot LSS$

LOWER BOUND: $L(R) \geq L(FS(R)) - (FS(R) - R) \cdot FSS$ where $U(\ )$ and $L(\ )$ respectively represent the upper and lower bound at any given point, and the quantities $(LS(R) - R)$ and $(FS(R) - R)$ represent the distance between R and its last shadower LS(R) and between R and its failing shadower FS(R), respectively. The forward constraint equations state that the upper bound of a point R must be less than or equal to the upper bound of the last shadower of R minus the distance between the two multiplied by the slope at which the last shadower occurred. Similarly, the lower bound of R must be greater than or equal to the lower bound of the failing shadower of R minus the distance between the two multiplied by the slope at which the failing shadower occurred.

The backward constraint equations are given as follows:

BACKWARD CONSTRAINT

UPPER: $U(FS(R)) \leq U(R) + (FS(R) - R) \cdot FSS$
LOWER: $L(LS(R)) \geq L(R) + (LS(R) - R) \cdot LSS$ The backward constraint equations state that the upper bound of the failing shadower of point R must be less than or equal to the upper bound of R plus the distance between them multiplied by the slope at which the failing shadower occurred. Similarly, the lower bound of the last shadower of R must be greater than the lower bound of R plus the distance between them multiplied by the slope at which the last shadower occurred.

It is seen that for any point R on the surface there are four constraint equations in each of the four trace directions: upper and lower bound forward constraints and upper and lower bound backward constraints. Therefore, there are 16 constraint equations in all for any given point, four for each trace direction.

Now that processing means 25 has stored the LS(R), FS(R), LSS and FSS for each point, for each of the four trace directions, and has set up the sixteen constraint equations for each point, a method of constraint propagation may be employed as follows to obtain a final surface determination.

Figure 7B:
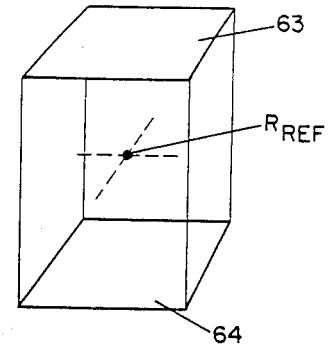

Initially, all points are given upper and lower bounds of plus and minus infinity, respectively. Since processing means 25 cannot function with a quantity of infinity, it is represented instead by a very large number. A point $R_{REF}$ on the surface is arbitrarily chosen as a reference point and assigned upper and lower bounds of zero. With reference to FIG. 7(a), the boundary line 61 represents an upper bound of plus infinity and boundary line 62 represents a lower bound of minus infinity. The point $R_{REF}$, having upper and lower bounds of zero, lies in the middle of upper boundary line 61 and lower boundary line 62. The coordinates of the boundary line correspond to the coordinate system superimposed on the binary images $BI_1 - BI_n$. FIG. 7(a) shows this point with reference only to the X-direction, i.e., the east and west directional traces, only for illustration. Since traces are made in both the east-west and north-south directions, the reference point $R_{REF}$ actually appears as shown in FIG. 7(b), the boundary lines 61 and 62 represented therein by boundary planes 63 nnd 64 in both the X and Y directions.

Once the reference point is chosen, the iterative constraint propagation process begins. Since the reference point $R_{REF}$ is now given upper and lower bounds of zero, it is known with greater precision than all other points. For the forward constraints, processing means 25 now searches the coordinates of all of the last and failing shadowers, LS(R) and FS(R), for each point in all four directional traces. If $R_{REF}$ has coordinates $(X_{REF}, Y_{REF})$ then any point R that has coordinates $(X_{REF}, Y_{REF})$ as the coordinates of its last or failing shadowers will now have its upper and lower bounds changed based on the effect of the reference point. For example, if $R_{REF}$ has coordinates (2, 3) then any point R having (2, 3) as the coordinates of its last or failing shadower can have new bounds calculated for it. Once the point R having $(X_{REF}, Y_{REF})$ as the coordinates of its last or failing shadowers is identified, processing means 25 will calculate new upper and lower bounds for R using the forward constraint equations. The new upper and lower bounds calculated for R now put a constraint on R's last and failing shadowers according to the backward constraint equations. Processing means 25 will then compute new upper and lower bounds for the last shadower LS(R) and failing shadower FS(R), according to the backward constraint equations.

Alternatively, all forward constraints can be computed before the backward constraints are computed. Also, the upper and lower bound calculations can be performed independent of one another.

After having made new upper and lower bound calculations for point R based on the sixteen constraint equations, processing means 25 will then move on to the next point which has $(X_{REF}, Y_{REF})$ as the coordinates of its last or failing shadowers, and perform the same operation, and continues as such until all points which have ($X_{REF}$, $Y_{REF}$) as coordinates of their last or failing shadowers have had new bounds calculated for them according to the constraint equations.

After new bounds have been calculated for all points having ($X_{REF}$, $Y_{REF}$) as the coordinates of their last or failing shadower, a new reference point is chosen. This can be arbitrarily chosen as before, but the better method would be to choose one of the points that has had new bounds calculated for it, since it will certainly produce a change in the bounds of other points affected by it. The constraint calculations are then made for all points affected by the new reference point, as described above, and the process keeps repeating as each new upper or lower bound for a point is calculated.

Processing means 25 will keep track of every point's upper and lower bounds for each pass through the sixteen constraint equations. Every time an upper or lower bound changes for any point, processing means 25 will indicate progress has been made. This may be accomplished by establishing a matrix in a storage means that mirrors the binary image matrix. This storage matrix is initially set at zero and every time a bound of a point changes it is made a one.

This iterative loop is continued until there is no change in any of the upper or lower bounds for any point, i.e., there is no more progress. Alternatively, the iterative loop may be stopped at any time by limiting the number of iterations if it is found that less than zero progress is sufficient. At this time, with reference to FIG. 8, there is a continuous upper bound constraint 65 on the surface shape, as well as a lower bound constraint 66. The final surface shape 67 is determined by taking the average of the continuous upper and lower bound constraints.

With reference to progress, it may be that redundant information is computed. For example, it may be known that point R has a certain upper bound C after calculation based on a first reference point, but the upper bound of R may be calculated to be higher than C based on another reference point. Obviously, the second calculation is not useful since it is already known that the upper bound of R cannot be higher than C, and as such is redundant. Similar reasoning applies to a known lower bound of point R. In this regard, processing means 25 will not regard the change in the upper bound based on the second reference point as progress because no new information on the upper bound C of point R has been obtained from the second calculation. Progress can, therefore, be defined as the lowering of an upper bound or the raising of a lower bound. Accordingly, there is no further progress when all the equations at all of the points generate information that is redundant.

With regard to the reference point $R_{REF}$, it may be arbitrarily chosen, as mentioned before, however, in a preferred embodiment, $R_{REF}$ is chosen as the highest point $R_{peak}$ of the surface. This is so because the highest point $R_{peak}$ will always be illuminated and consequently will have no last or failing shadowers, but will undoubtedly be the last or failing shadower of a number of other points.

The location of $R_{peak}$ is easily determined by processing means 25 using the binary images $BI_1$ and $BI_n$ in the east-west and north-south directional traces. With reference to FIG. 9, at light source position $P_1$, the light first strikes surface 21 at the point $R_{peak}$, as well as points surrounding $R_{peak}$ in the direction of illumination. The points surrounding $R_{peak}$ away from the direction of the light source remain in shadow. This is true for the north, south, east and west directional traces. Thus, the point that is illuminated, i.e., at a logic one, in the binary images $BI_{1(E-W)}$, $BI_{n(E-W)}$, $BI_{1(N-S)}$ and $BI_{n(N-S)}$ is the point $R_{peak}$. Processing means 25 can scan each of these images and determine which was the common illuminated point for each image and use that point as $R_{REF}$ in beginning the iteration process.

While the aforedescribed method will always yield the correct configuration of subject surface 21, it can be appreciated that the random selection of reference points based solely on changing upper and lower bounds will yield much redundant information and will require a large amount of processing time and storage area. This iterative step can be streamlined as follows.

As described above, after a first reference point is chosen, processing means 25 effectively sorts through all points to determine if any had ($X_{REF}$, $Y_{REF}$) as the coordinates of their last or failing shadower, i.e., was any point affected by the reference point. Rather than randomly sorting through all points, the process is carried out according to the following restrictions.

Having coordinates ($X_{REF}$, $Y_{REF}$) of the reference point $R_{REF}$, if the forward constraint equations are being solved, then the next point chosen will be the next X or Y in the opposite direction of the direction of illumination. For the forward eastern AM directional trace, processing means 25 will look at the next point in the negative X direction $X_{REF}-1$, $Y_{REF}$) to see if it had $R_{REF}$ as a last or failing shadower, negative X being the direction opposite to that of the direction of illumination for the eastern AM trace.

The X coordinate is, thereafter, decreased in the negative X direction until the last X, i.e., X=0, and then the Y coordinate is incremented and the process is repeated until the last Y.

For the forward western PM directional trace, the process is the same except that the direction opposite to the direction of illumination is the positive X direction so the first point interrogated is ($X_{REF}+1$, $Y_{REF}$) and X increases thereafter until the last X, i.e., X=15.

For the forward northern AM directional trace, the direction opposite the direction of illumination is the negative Y direction so the first point interrogated is ($X_{REF}$, $Y_{REF}-1$) and Y decreases thereafter until the last Y, i.e., Y=0.

For the forward southern PM directional trace, the direction opposite the direction of illumination is the positive Y direction so the first point interrogated is ($X_{REF}$, $Y_{REF}+1$) and Y increases thereafter until the last Y, i.e., Y=15.

If the backward constraint equations are being solved, then the next point chosen will be the next X or Y in the direction of illumination. The analysis for all four directional traces is the same as heretofore described with respect to the forward constraint equations, except X or Y is either increased or decreased in an opposite manner.

The surface obtained in accordance with the above-described method is a relative surface. In many applications, only the relative surface is needed. If the absolute size of the surface is needed, the coordinate system must be translated or offset based on a known quantity, or some known reference point, for example the height of the table, must also be supplied to processing means 25 before it can determine that exact size.

In a second embodiment of the present invention, the light source 20 is placed at a near distance to the subject surface 21 as shown in FIG. 10.

In the instant embodiment, the apparatus and method are the same as in the previous embodiment with the sole exception that all of the points on the surface do not see the light source at the same angle for any given position of the source. If the light source 20 is fixed at a position $P_3$, the slope of the illumination is positive with respect to a point $R_1$, negative with respect to a point $R_2$, and infinite, i.e., the light is directly overhead, with respect to a point $R_3$.

The only difference between the near placement of the light source and placement in accordance with the previous embodiment is that the position $P_p$, which defines the end of the AM trace, is the same for all binary images taken in the case of the substantially infinite light source. In the near source case the point $P_p$ is relative for each position of the light source.

In the instant embodiment, for the east-west directional trace, the AM is defined as those positions of the light source from the point R in the increasing X direction, as labelled in FIG. 10. The PM is defined as those positions of the light source from the point R in the decreasing X direction, also as shown in FIG. 10. For the north-south trace AM is all positions of the light source from point R in the increasing Y direction; PM is all positions of the light source from point R in the decreasing Y direction.

Consequently, each point will now have a number of constraint equations equal to four times the number of light sources.

The method of solution is the same as previously described, except that instead of solving sixteen constraint equations during each pass, processing means 25 will have to solve many more equations.

It should be noted that if what is required is simply a one-dimensional surface determination, it can be accomplished in accordance with the present invention by simply eliminating one of the orthogonal directional traces and the resultant calculations therefrom.

The detailed description of the preferred embodiment of the invention having been set forth herein for the purpose of explaining the principles thereof, it is known that there may be modification, variation or change in the invention without departing from the proper scope of the invention and the claims thereto.

We claim:

1. A method of determining the shape of a surface comprising:

illuminating the surface sequentially from locations along a first path and along a second path intersecting said first path at a peak point directly above said surface; said paths defining four reference directions;

locating said light source at a plurality of positions of said first and second paths to illuminate the surface from said plural positions along differing slopes with respect to said surface, for each of said four reference directions; said light source illuminating all of said surface only at said peak point;

photographing said surface with a binary image camera at each of said plurality of positions of said light source along said first and second paths, said binary image camera having as its binary image output a digital matrix whose pixel elements correspond to a plurality of points on said surface, said pixel elements assuming a binary value if a corresponding photographed point on said surface is in shadow and an opposite binary value if a corresponding photographed point on said surface is illuminated, said binary image output having coordinate means superimposed thereon for locating any of said pixel elements of said matrix;

outputting each of said binary images of said surface for the plurality of fixed positions of said light source to processing means for storage therein;

identifying and recording by said process means, for each of said points on said surface, for each of said four reference directions, the last shadower slope LSS, the failing shadower slope FSS, the last shadower LS and the failing shadower FS, assigning infinite upper and lower bounds to each of the plurality of said points on said surface except a reference point;

assinging said reference point upper and lower bounds of zero, calculating new upper and lower bounds for each of said plurality of points and its respective last and failing shadowers such that the upper bound of each of said plurality of points must be less than the upper bound of its last shadower minus the quantity of the distance between said point and its last shadower multiplied by the last shadower slope and the lower bound of each said plurality of points must be greater than the lower bound of its failing shadower minus the quantity of the distance between said point and its failing shadower multiplied by the failing shadower slope and the upper bound of the failing shadower of each of said plurality of points must be less than the upper bound of said point added to the quantity of the distance between said failing shadower and said point multiplied by the failing shadower slope, and the lower bound of the last shadower of each of said plurality of points must be greater than the lower bound of said point added to the quantity of the distance between said last shadower and said point multiplied by the last shadower slope, repeating said calculation until the upper and lower bounds of each of the plurality of said points and its last and failing shadowers does not change with respect to a prior calculated value;

averaging the upper and lower bounds of each of said plurality of points and its last and failing shadowers; and outputting said average of the plurality of points as the shape of said surface.

2. A method according to claim 1 wherein said first path is an east-west path, said second path is a north-south path, and said light source is a collimated light source.

3. An apparatus for determining the shape of a surface comprising:

a light source for illuminating a surface sequentially from locations along a first path and along a second path intersecting said first path at a peak point directly above said surface; said paths defining four reference directions;

said light source being located at a plurality of positions of said first and second paths to illuminate the surface from said plural positions along differing slopes with respect to said surface, for each of said four reference directions; said light source illuminating all of said surface only at said peak point;

a binary image camera for photographing said surface at each of said plurality of positions of said light source along said first and second paths, said binary image camera having as its binary image output a digital matrix whose pixel elements correspond to a plurality of points on said surface, said pixel elements assuming a binary value if a corresponding photographed point on said surface is in shadow and an opposite binary value if a corresponding photographed point on said surface is illuminated, said binary image output having coordinate means superimposed thereon for locating any of said pixel elements of said matrix;

processing means, including memory means, for storing each of said binary images of said surface for the plurality of fixed positions of said light source;

said processing means identifying and recording for each of said points on said surface, for each of said four reference directions, the last shadower slope LSS, the failing shadower slope FSS, the last shadower LS and the failing shadower FS, and assigning infinite upper and lower bounds to each of the plurality of said points on said surface except a reference point, and assigning said reference point upper and lower bounds of zero;

said processing means also including calculating means for calculating new upper and lower bounds for each of said plurality of points and its respective last and failing shadowers such that the upper bound of each of said plurality of points must be less than the upper bound of its last shadower minus the quantity of the distance between said point and its last shadower multiplied by the last shadower slope and the lower bound of each said plurality of points must be greater than the lower bound of its failing shadower minus the quantity of the distance between said point and its failing shadower multiplied by the failing shadower slope and the upper bound of the failing shadower of each of said plurality of points must be less than the upper bound of said point added to the quantity of the distance between said failing shadower and said point multiplied by the failing shadower slope, and the lower bound of the last shadower of each of said plurality of points must be greater than the lower bound of said point added to the quantity of the distance between said last shadower and said point multiplied by the last shadower slope; for repeating said calculation until the upper and lower bounds of each of the plurality of said points and its last and failing shadowers does not change with respect to a prior calculated value and for averaging the upper and lower bounds of each of said plurality of points and its last and failing shadowers; and output means for representing said average of the plurality of points as the shape of said surface.

4. An apparatus according to claim 3, wherein said light source is a collimated light source.

5. An apparatus according to claim 4, wherein said first path is an east-west path and said second path is a north-south path.

6. An apparatus according to claim 3, wherein said light source is a series of collimated light sources lit sequentially along each of said first and second path.

7. An apparatus according to claim 4, wherein said light source is located at said plurality of positions along said first and second paths by moving slidably along a track.

8. An apparatus according to claim 4, wherein said light source is located at said plurality of positions along said first and second paths by a mobile robotic arm.

* * * * *

UNITED STATES PATENT AND TRADEMARK OFFICE
CERTIFICATE OF CORRECTION

PATENT NO. : 4,792,696
DATED : Dec. 20, 1988
INVENTOR(S) : Kender et al.

It is certified that error appears in the above-identified patent and that said Letters Patent is hereby corrected as shown below:

Col. 5, line 35, "shadowes" should read --shadower--.

Signed and Sealed this

Twenty-second Day of August, 1989

Attest:

DONALD J. QUIGG

*Attesting Officer*  *Commissioner of Patents and Trademarks*